United States Patent
Khoury

(10) Patent No.: US 9,037,114 B2
(45) Date of Patent: May 19, 2015

(54) SMS MESSAGE NOTIFICATION ARRANGEMENT

(75) Inventor: Sami Khoury, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 401 days.

(21) Appl. No.: 12/685,719

(22) Filed: Jan. 12, 2010

(65) Prior Publication Data

US 2011/0171936 A1      Jul. 14, 2011

(51) Int. Cl.
*H04M 1/66* (2006.01)
*H04L 12/58* (2006.01)

(52) U.S. Cl.
CPC ........... *H04L 12/587* (2013.01); *H04L 12/5895* (2013.01); *H04L 51/24* (2013.01)

(58) Field of Classification Search
USPC .......................................... 455/412.1, 412.2
See application file for complete search history.

(56) References Cited

U.S. PATENT DOCUMENTS

| | | | |
|---|---|---|---|
| 7,102,620 B2 | 9/2006 | Harries et al. | |
| 7,200,636 B2 | 4/2007 | Harding | |
| 7,209,916 B1 | 4/2007 | Seshadri et al. | |
| 7,295,836 B2 | 11/2007 | Yach et al. | |
| 7,298,714 B2 | 11/2007 | Foster | |
| 7,363,026 B2 * | 4/2008 | Clarke et al. | 455/412.2 |
| 7,467,183 B2 | 12/2008 | Arcuri et al. | |
| 8,688,790 B2 * | 4/2014 | LeVasseur et al. | 709/206 |
| 2003/0050046 A1 | 3/2003 | Conneely et al. | |
| 2003/0195936 A1 | 10/2003 | Lu et al. | |
| 2003/0222765 A1 * | 12/2003 | Curbow et al. | 340/309.7 |
| 2004/0088357 A1 | 5/2004 | Harding | |
| 2004/0162879 A1 | 8/2004 | Arcuri et al. | |
| 2004/0198403 A1 | 10/2004 | Pedersen et al. | |
| 2005/0021540 A1 | 1/2005 | McKee et al. | |
| 2006/0224681 A1 * | 10/2006 | Wurster | 709/206 |
| 2006/0293032 A1 | 12/2006 | Clarke et al. | |
| 2007/0060177 A1 | 3/2007 | Major | |
| 2007/0169107 A1 | 7/2007 | Huttunen | |

(Continued)

FOREIGN PATENT DOCUMENTS

CN     1372207     10/2002

OTHER PUBLICATIONS

Kayne R. , "What is Email Notification?", Retrieved at <<http://www.wisegeek.com/what-is-email-notification.htm>>, 2009, pp. 2.

(Continued)

*Primary Examiner* — Charles Appiah
*Assistant Examiner* — Randy Peaches
(74) *Attorney, Agent, or Firm* — Brian Haslam; Mike Allen; Micky Minhas

(57) ABSTRACT

A method for applying personalized rules to an incoming e-mail message includes receiving an e-mail message addressed to a user and forwarding a copy of the e-mail message to a mobile communication device associated with the user. One or more pre-defined rules associated with the user are applied to the e-mail message. At least one of the pre-defined rules is identified that the e-mail message satisfies. The identified rule specifies that a text message such as an SMS message be sent to the mobile communication device indicating that an e-mail message satisfying the pre-defined rule has been received. The text message includes a link that allows the user to directly access the e-mail with the mobile communication device's user interface.

16 Claims, 6 Drawing Sheets

(56) References Cited

U.S. PATENT DOCUMENTS

| | | |
|---|---|---|
| 2008/0152095 A1 | 6/2008 | Kleindienst et al. |
| 2008/0270560 A1 | 10/2008 | Tysowski et al. |
| 2009/0031393 A1* | 1/2009 | Denner et al. .................... 726/1 |
| 2009/0138562 A1 | 5/2009 | Schmulen et al. |
| 2009/0161845 A1 | 6/2009 | Adams et al. |
| 2009/0265763 A1* | 10/2009 | Davies et al. .................... 726/3 |

OTHER PUBLICATIONS

"Example Applications of SMS Messaging", Retrieved at <<http://www.developershome.com/sms/sms_tutorial.asp?page=egApps>>, Monday, Oct. 5, 2009, pp. 5.

"SMS—> User Applications", Retrieved at <<http://www.m-indya.com/sms/user_applications.htm>>, 2005, pp. 3.

Branch, John, "The Bridge between Email and SMS Text by MailBeep", Retrieved at <<http://www.articlesbase.com/cell-phones-articles/the-bridge-between-email-and-sms-text-by-mailbeep-1066252.html>>, Jul. 24, 2009, pp. 3.

Ryan, "CyberNotes: "Push" Email Using SMS Text Messages ", Retrieved at <<http://cybernetnews.com/cybernotes-push-email-using-sms-text-messages/#>>, Sep. 4, 2008, pp. 8.

"What are SMS Mail Alerts? ", Retrieved at <<http://help.yahoo.com/l/au/yahoo7/mobile/mail/mail-192143.html>>, Jul. 30, 2007, p. 1.

"Email Alert SMS ", Retrieved at <<http://www.ise-p.com/links/AlertGateway/EmailSMS.htm>>, Oct. 5, 2009, pp. 2.

Author Unknown, "What is an Exchange Server e-mail account?—Outlook—Microsoft Office Online" downloaded Oct. 20, 2009, 2 pages—http://office.microsoft.com/en-us/outlook/ha010955041033.aspx.

Author Unknown, "It Solutions Now—What is Microsoft Exchange?" downloaded Oct. 20, 2009, 1 page—http://www.exchangemailhosting.com/exchange/learning/.

Author Unknown, "Mi8: What is Microsoft Exchange?" downloaded Oct. 20, 2009, 2 pages—http://www.mi8.com/exchange_hosting/why_exchange/.

Author Unknown, "Microsoft Exchange Server 2010 Overview" downloaded Oct. 20, 2009, 1 page—http://www.microsoft.com/exchange/2010/en/us/overview.aspx.

Author Unknown, "Microsoft Exchange Server 2010 Outlook Web Access" downloaded Oct. 20, 2009, 1 page—http://www.microsoft.com/exchange/2010/en/us/outlook-web-access.aspx.

Author Unknown, "Microsoft Exchange Server 2010 Mobile Devices" downloaded Oct. 20, 2009, 1 page—http://www.microsoft.com/exchange/2010/en/us/mobile-devices.aspx.

CN Notice on the First Office Action for Application No. 201110022409.X, Jan. 16, 2013.

CN Notice on the Second Office Action for Application No. 201110022409.X, May 9, 2013.

CN Decision on Rejection for Application No. 201110022409.X, Sep. 5, 2013.

* cited by examiner

SMS MESSAGE NOTIFICATION ARRANGEMENT

BACKGROUND

Communication devices, such as smart phones, personal digital assistants (PDAs), personal computers, and the like, are commonly used to receive, transmit, store, and display messages such as electronic mail (e-mail), short message service (SMS) messages, instant messages (IM), and even non-text messages such as voice-mail messages. Such communication devices may be provided with a messaging application executable on the device to manage such messages, allowing the user to receive messages; read (or otherwise peruse or hear the contents) of the messages; and respond to, save, delete, and/or file the message in a folder on the communication device, as desired. The messaging application typically provides a user interface that displays the messages stored at the communication device, or at least a subset of those messages, to the user in chronological or reverse chronological order.

The user interface typically displays on its top-level or home screen a counter listing the number of unread messages. A user may periodically glance at the home screen on his or her communication device to see if any e-mail messages have arrived since the last time they checked. However, the value of this counter is diminished by the large volume of e-mail received by a typical enterprise user: this counter is almost always non-zero. In fact, the number of messages is often measured in the dozens, and thus the relative importance of the counter to the user when it goes from, say, 52 to 53 is next to nil. In other words, it can become very difficult for a user to identify e-mail messages that are particularly important to them upon their arrival.

SUMMARY

Many users, particularly enterprise users, can accumulate a significant number of e-mail messages on their mobile communication devices. Accordingly, the total number of messages, both read and unread, can become quite large. The user may have difficulty distinguishing between messages that are truly of high importance and which should be attended to immediately, and those that can be read at a later time. In part because SMS and other text-based messages are generally viewed as a real-time method of communication, many users will more often read a text message immediately even if they have unread e-mail messages. As a result SMS messages do not tend to accumulate to the same degree as e-mail messages. Users may therefore expect to see a much lower number of SMS messages on their home screen in comparison to e-mail messages, and, indeed the number of unread SMS messages will often be zero. Therefore, such users may be more inclined to read an SMS as soon as it arrives.

In one illustrative example, the perceived importance of SMS messages can be leveraged in order to alert the user as to the arrival of an e-mail message that they deem to be of high importance and which satisfy user-defined rules that have been previously established. Specifically, the user's mobile communication device is sent an SMS message indicating the arrival of an e-mail message that satisfies the pre-defined rule. The SMS message may provide any desired information concerning the e-mail and in some cases may even incorporate all or part of the e-mail message. In some implementations the SMS message also includes a link that allows the user to directly access the e-mail with the mobile communication device's user interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
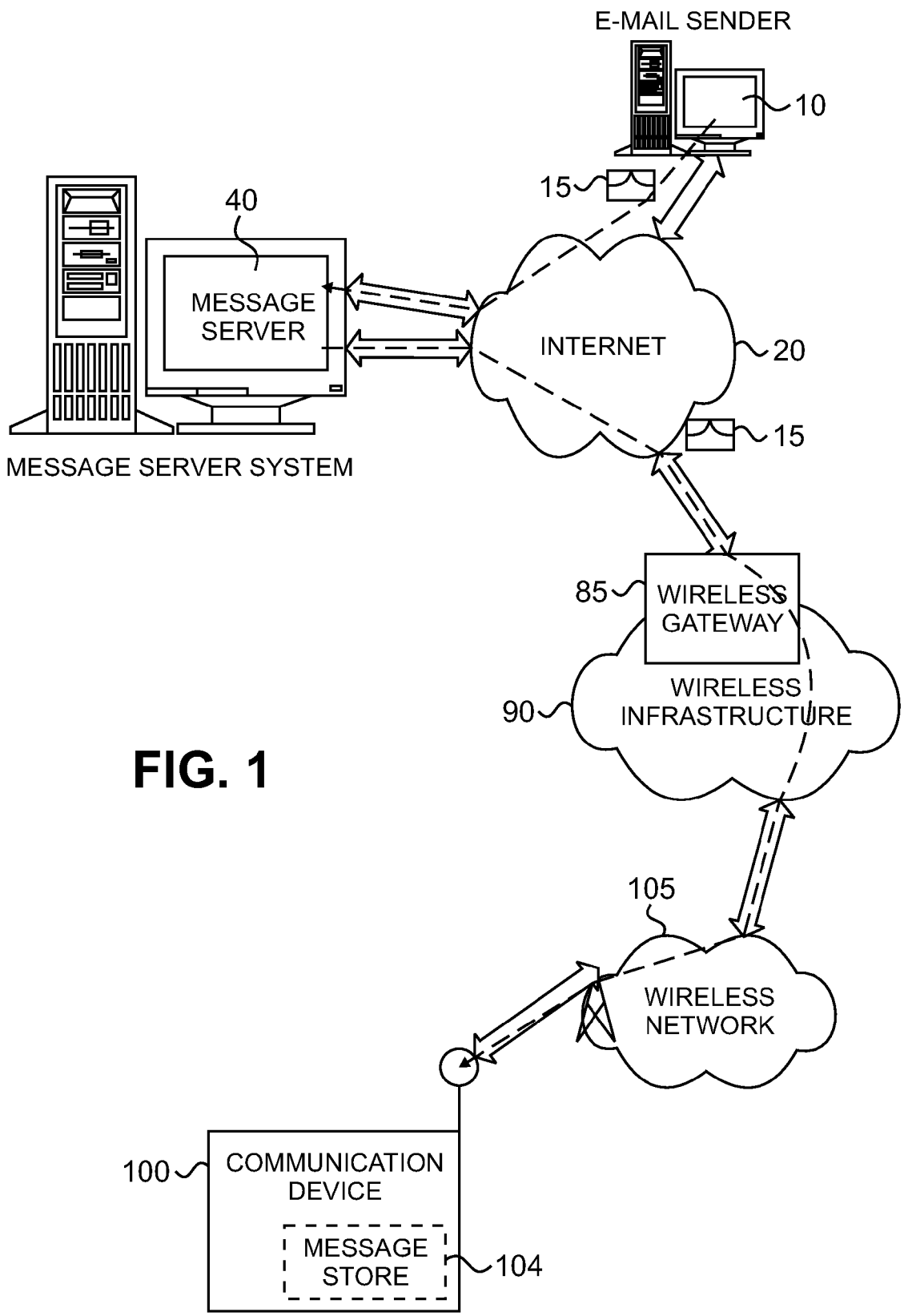
FIG. 1 is an illustrative environment in which messages are delivered to communication device.

FIG. 1 is an illustrative environment in which messages are delivered to communication device. One skilled in the art will appreciate that there may be many different topologies employed and that the topology and architecture shown in FIG. 1 is used to simply facilitate an understanding of how such messages are received. FIG. 1 shows a message sender system 10, the Internet 20, a message server system 40, a wireless gateway 85, wireless infrastructure 90, a wireless network 105 and a communication device 100. A message sender system 10 may, for example, be connected to an ISP (Internet Service Provider) on which a user of the system 10 has an account, located within a company, possibly connected to a local area network (LAN), and connected to the Internet 20. Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP system or the like, and acts as the main interface for e-mail exchange over the Internet 20. Although other messaging systems might not require a message server system 40, a mobile device 100 configured for receiving and possibly sending e-mail will normally be associated with an account on a message server. Two common message servers are Microsoft Exchange™ and Lotus Domino™, which are often used in conjunction with Internet mail routers (not shown) that route and deliver mail. Message servers such as the server 40 typically offer functionality in addition to the sending and receiving of e-mail; they may also include dynamic database storage engines that have predefined database formats for data like calendars, to-do lists, task lists, e-mail and documentation. The message server 40 may further be configured to receive multimedia messages comprising images, videos, rich text format content, and audio.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The message is stored in the message store 104. The particular network 105 may be virtually any wireless network over which messages may be exchanged with a mobile communication device.

As shown in FIG. 1, a message such as an e-mail message 15 is sent by an e-mail sender 10, located somewhere on the Internet 20. In some implementations this message 15 is fully in the clear and uses traditional Simple Mail Transfer Protocol (SMTP), RFC 2822 (Request for Comment 2822 published by the Internet Society, "Internet Message Format"), headers and Multipurpose Internet Mail Extension (MIME) body parts to define the format of the mail message. The messaging application used by the sender 10 generally provides separate data fields, such as a message recipient field (i.e. a "TO" field), a message sender field (i.e. a "FROM" field), a carbon copy field (i.e. a "CC" field), a message subject field (i.e. a "SUBJECT" field), and a message body field, for the ease of entering/reading e-mail information. In addition, if the messaging application utilized by the sender 10 allows for the indication of an "importance" level for the message, such an indication may be inserted into the header of the message, for example using the non-standard x-Priority: field with a value indicating the importance level of the message. The importance level may be designated with a character string or a numeric value; for example, "low", "normal", or "high" if there are three possible levels of importance assignable by the messaging application utilized at the sender system 10, or "0" for normal importance and "1" for high importance if only two levels of importance are assignable. These techniques are known to those skilled in the art.

The message 15 arrives at the message server 40 and is normally stored in a message store. In one implementation, messages addressed to a message server account associated with a host system such as a home computer or office computer which belongs to the user of a communication device 100 are redirected from the message server 40 to the communication device 100 as they are received. That is, the messages may be pushed to the communication device 100. However, in other implementations the messages may be pulled by the communication device 100 from the message server 40. The user of the communication device 100 may handle messages received at the message server account at a home or office computer as well as at the communication device 100, by reading, replying to, forwarding, deleting, or archiving the received messages.

Regardless of the specific mechanism controlling the forwarding of messages to the communication device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Such wireless networks will be known to those skilled in the art.

One currently popular example of a wireless network that may be employed operates in accordance with Global System for Mobile Communications (GSM) and General Packet Radio Service (GPRS), which often have the ability to send and receive packet-based data such as e-mail and Internet data. The packet data service provided by GPRS makes this possible. Without GPRS, a GSM network cannot provide for the communication of e-mail messages in a conventional manner. Put another way, when an otherwise e-mail-capable mobile device utilizes a GSM network that does not make GPRS available, the mobile device cannot send or receive e-mail messages.

Message server 40 may include an e-mail filter that processes e-mail for multiple e-mail users. An e-mail filter allows user-customized rules to be applied to incoming e-mail messages that allows the user to automatically perform a wide range of actions on the e-mail message. In general, the personalized rules can include any type of e-mail filtering rules. In some implementations a given personalized rule identifies a specific component of the e-mail message, a specific value or set of values for the component, and an action to take if the value or set of values is found within the component. For example, e-mail message components can generally include any component of an e-mail message such as: the "to" field, the "from" field, the subject, the domain, the account, the server chain through which the message was delivered, authentication information, the message body, and the presence (or absence) of an attachment. Commonly employed actions for a given rule typical include filtering out the message, presenting the message to the user, placing the message in a specific folder, or forwarding the message to another server.

In addition to e-mail, another service often available on wireless networks is the short message service (SMS). SMS is a service available on many communication devices that permits the sending of short messages (also known as text messages) between mobile phones, other handheld devices, computers, and even standard landline phones. Unlike e-mail, SMS messaging does not involve the use of e-mail-like data fields but rather only a single message field for the entering/reading of the text message.

SMS was originally designed as part of the GSM digital mobile phone standard, but is now available on a wide range of networks, including Third Generation (3G) networks. For instance, GSM networks without GPRS capability can still provide SMS service. The SMS service is sometimes offered as a premium service, where messages are billed on a per-message or per-kilobyte basis. Wireless networks generally implement SMS with the use of a Short Message Service Center (SMSC), which acts as a store-and-forward system for relaying short messages. Messages are stored in the network until the destination communication device becomes available, so an end user can receive or transmit an SMS message at any time, whether a voice call is in progress or not.

As previously mentioned, many users, particularly enterprise users, can accumulate a significant number of e-mail messages on their mobile communication devices. Accordingly, the total number of messages, both read and unread, can become quite large. The user may have difficulty distinguishing between messages that are truly of high importance and which should be attended to immediately, and those that can be read at a later time.

In part because SMS and other text-based messages are generally viewed as a real-time method of communication, many users will more often read a text message immediately even if they have unread e-mail messages. As a result SMS messages do not tend to accumulate to the same degree as e-mail messages. Users may therefore expect to see a much lower number of SMS messages on their home screen in comparison to e-mail messages, and, indeed the number of unread SMS messages will often be zero. Therefore, such users may be more inclined to read an SMS as soon as it arrives.

The perceived importance of SMS messages can be leveraged in order to alert the user as to the arrival of an e-mail message that they deem to be of high importance and which satisfy user-defined rules that have been previously established. Specifically, the user could be sent an SMS message indicating the arrival of an e-mail message that satisfies the pre-defined rule. The SMS message may provide any desired information concerning the e-mail and in some cases may even incorporate all or part of the e-mail message. In some cases the SMS message also includes a link that allows the user to directly access the e-mail with the mobile communication device's user interface. In the event that the e-mail has not already been downloaded to the mobile communication device, selection or activation of the link may cause the e-mail to be downloaded and then opened.

The SMS message may be generated and sent by any suitable device. For instance, in the arrangement shown in FIG. 1 the SMS message may be generated and sent by the message server 40 since that is the device that receives and forwards the e-mail to the user's mobile communication device. Moreover, as previously mentioned, many message servers such as message server 40 often already allows users to establish rules for managing their e-mails. In the present case rules may be established that cause an SMS message to be generated when an e-mail message is received that meets the rule's criterion or criteria. In another implementation, the SMS message may be generated and sent by the user's PC, particularly in those cases where the PC is already forwarding the e-mail message to the user's mobile device. Various scheduling applications such as Microsoft Outlook™, for example, currently provide an e-mail filter that let users establish rules defining how e-mail should be handled.

Figure 2:
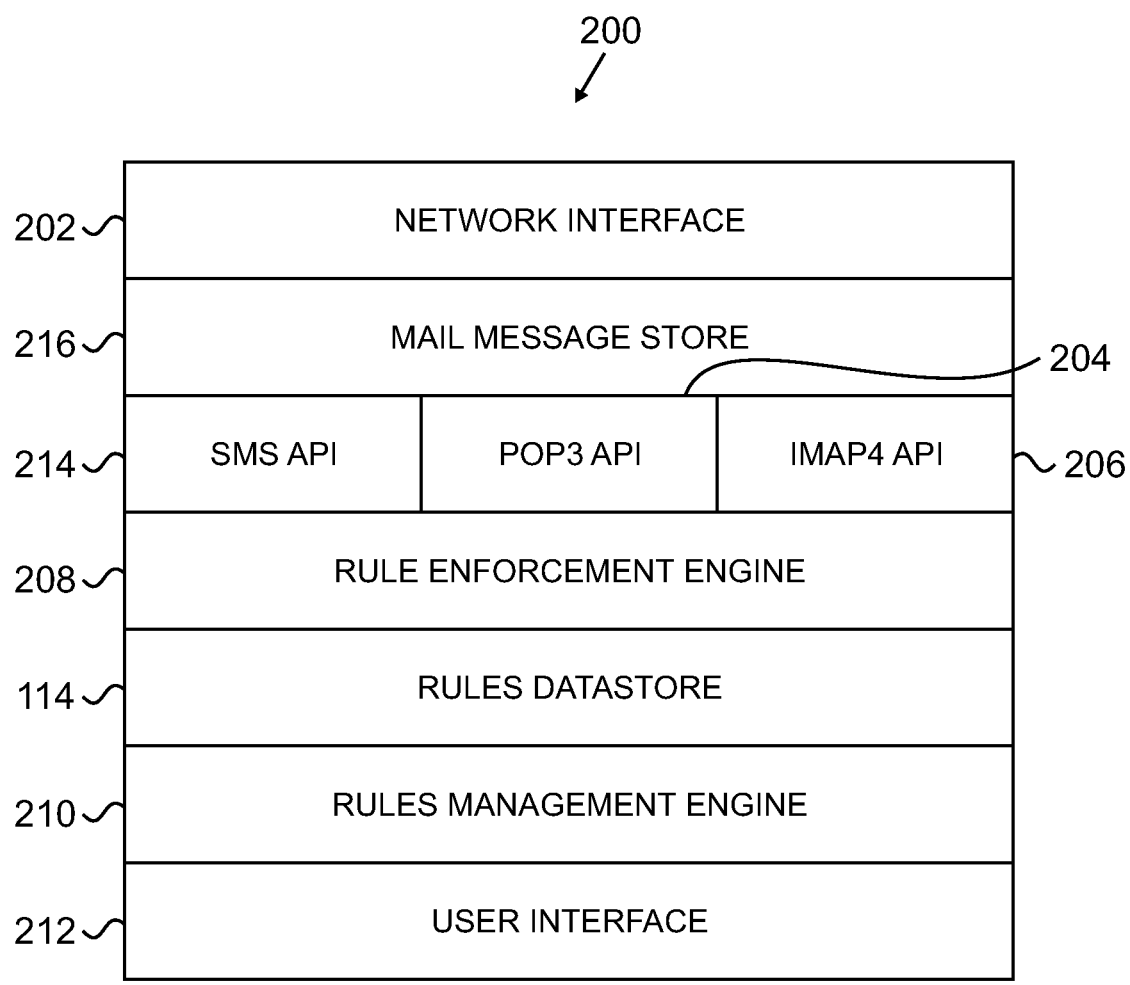
FIG. 2 is a simplified diagram showing one example of the logical architecture of a message server that generates and forwards SMS message informing a user that an e-mail message has arrived.

FIG. 2 is a simplified diagram showing one example of the logical architecture of message server 40 for those implementations in which it generates and forwards the SMS message. Architecture 200 includes abstracted logical elements that are typically implemented in hardware, software, firmware, or any combination thereof. The message server 40 includes user interface 212, rules management 210, rules datastore 114, rule enforcement engine 208, SMS API 214, POP3 API 204, IMAP4 API 206, mail message store 216 and network interface 202.

A given user can establish rules by interacting with rule management engine 210 within the message server 40 through user interface 212. Note that rule management engine 210 facilitates adding, removing and/or modifying rules, which are stored in rules datastore 114. Rules enforcement engine 208 applies the rules within rules datastore 214 to e-mail messages that are received by the server 40. This can be accomplished using any standard mail protocol. For example, in some implementations, rule enforcement engine 208 applies the rules using either the Post Office Protocol 3 (POP3) protocol or the Internet Message Access Protocol 4 (IMAP4) protocol by making calls through a POP3 application programming interface (API) 204 or an IMAP4 API, respectively. These calls facilitate access to the e-mail messages stored in mail message store 216. In the event that the message server 40 is a Microsoft Exchange™ Server that pushes messages to the communication device 100, the architecture 200 may also include an Exchange ActiveSync API (not shown).

SMS API 214 provides SMS message communication with the wireless network over network interface 202. In this way the SMS API can assist rule enforcement engine 208 in composing an SMS message to be delivered to the user when an e-mail message satisfying an appropriate rule is received. If other types of text messages are employed, the appropriate API will be used instead of the SMS API 214.

It should be noted that instead of SMS messages other types of text messages may be sent to a mobile communication device in order to alert the user of receipt of an e-mail message that satisfies pre-established rules. For instance, other text messaging services are currently available such as MMS (multi-media services) for sending photos and other multi-media items and mobile IM or IMS (instant messaging services). Although these or other text messaging services may be employed, for purposes of illustration SMS messaging services will continue to be discussed herein.

Figure 3:
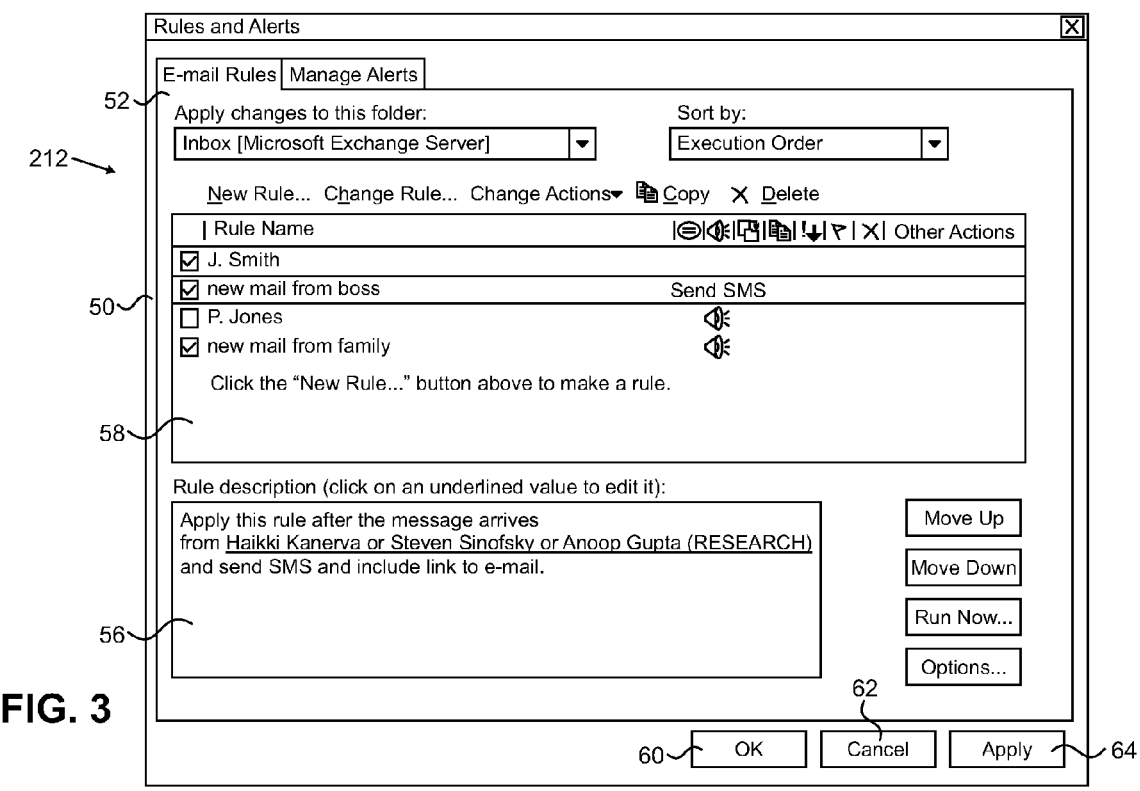
FIG. 3 shows an illustrative user interface provided by a message server for managing e-mail rules.

Turning now to FIG. 3, an illustrative user interface for managing e-mail rules will be described. As shown in FIG. 3, the e-mail interface 212 provided by message server 40 includes a displayed portion for managing e-mail rules. The displayed portion of the user interface window 50 for managing e-mail rules is selected through the "e-mail rules" tab 52. Once the tab 52 has been selected, the list of e-mail rules 58 is displayed. The list of e-mail rules 58 lists all currently active e-mail rules in the order that they are applied. User interface buttons may be provided to change the order of the e-mail rules in the list of e-mail rules 58. Additionally, a user interface window pane 56 displays the contents of the e-mail rule for a selected rule in the list of e-mail rules 58. Other user interface objects are also provided for creating a new rule, changing a rule, deleting a rule, or changing the actions that are associated with a particular rule.

Figure 4:
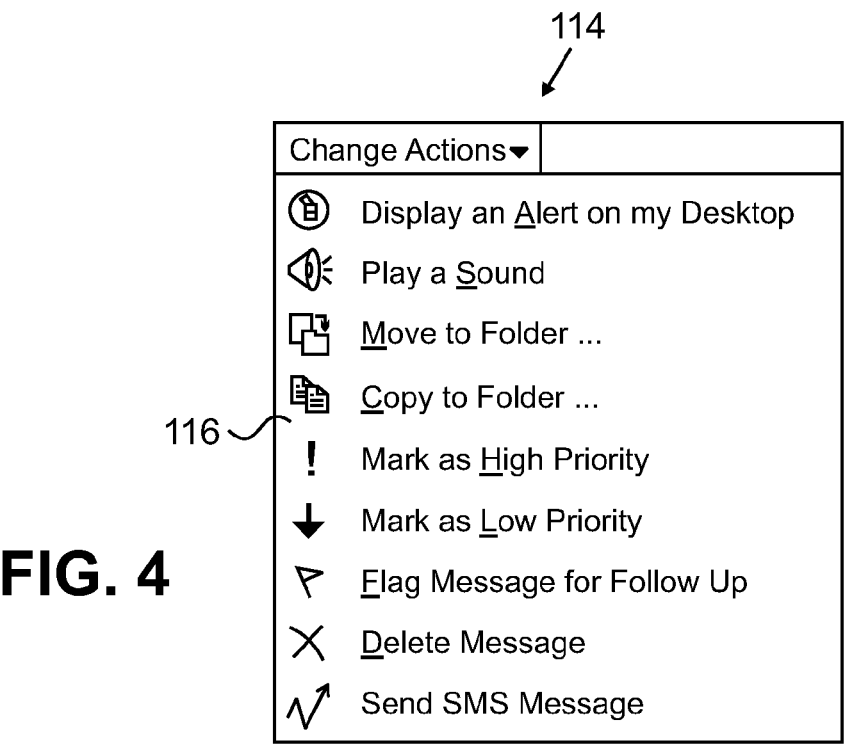
FIG. 4 illustrates a drop-down menu showing a list of actions that may be performed on an e-mail message by an e-mail rule.

FIG. 4 illustrates a drop-down menu 114 showing a list of actions 116 that may be performed on an e-mail message. The list of actions 116 includes actions for displaying an alert on the user interface desktop, playing a sound, moving or copying the e-mail message, assigning priorities to the e-mail message, flagging the message for follow up, and deleting the message. In addition, another one of actions 116 is an action to send an SMS message to the user's mobile communication device indicating that an e-mail has been received. A user may select the "apply" button 64 to apply any changes. A user may also select the "OK" button 60 or the cancel button 62 when the user has completed their use of the user interface window 50.

Figure 5:
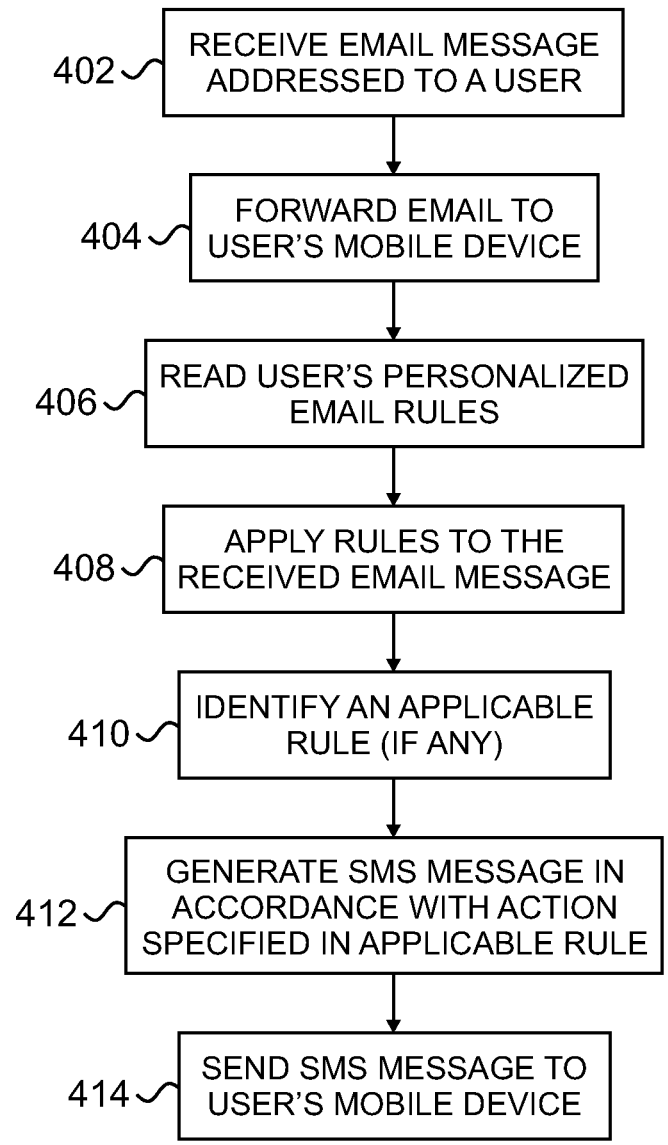
FIG. 5 is a flowchart illustrating on example of how an e-mail message may be processed by a message server such as the message server shown in FIG. 1.

FIG. 5 is a flowchart illustrating on example of how an e-mail message may be processed by a message server such as the message server 40 shown in FIG. 1. The process starts in step 402 when the message server receives an e-mail message that is addressed to a user registered with or otherwise associated with the message server. The e-mail server forwards a copy of the e-mail message to the user's mobile communication device [push or pull] in step 404, generally in a push mode of operation. The message server may also send the e-mail message to another location as specified by the user such as a fixed-location PC. Next, in step 406 the message server reads the user's personalized rules from the rules datastore. The message server applies these personalized rules to the e-mail message that was received in step 408. If the e-mail message is identified in step 410 as meeting the criterion or criteria established by the rule, the message server then performs the corresponding action in step 412. In this example the e-mail message that is receives satisfies a rule that instructions the message server to send an SMS message to the user's mobile communication device informing the user that a priority e-mail message has been received. Accordingly, in step 412 the message server generates an SMS message addressed to the user. The SMS message may include any information that indicates the arrival of a priority e-mail message. For instance, the SMS message may include the sender's e-mail address and identity. The SMS message also points to the location of the e-mail message on the communication device. For instance, the SMS message may include the location information in a machine-readable format so that the communication device can read the information and provide a link to the e-mail to which the SMS message pertains. In some implementations, the SMS message may include, in addition to or as an alternative to the above items, a subset of the actual e-mail content such as selected fields in the message (e.g., the sender, subject, importance flag, first part of the message's body). Finally, in step 414 the SMS message is sent to the user's mobile communication device.

Figure 6:
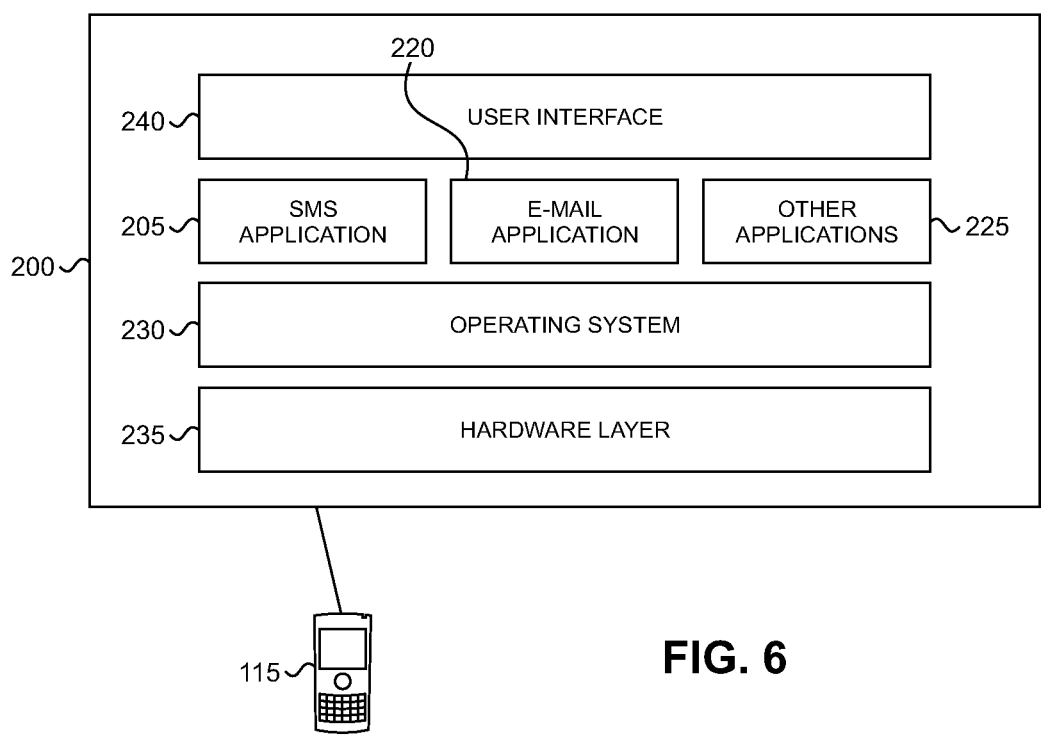
FIG. 6 shows an illustrative architecture of the major functional components that are used to facilitate the present arrangement and which may be implemented on a wireless mobile communication device such as a mobile phone.

FIG. 6 shows an illustrative architecture 200 of the major functional components that are used to facilitate the present arrangement and which may be implemented on a wireless mobile communication device 115 such as those described above. Although the architecture 200 shown in FIG. 2 is particularly adapted for a mobile phone, the fundamental principles it illustrates can be expected to have general applicability to other platforms. In this illustrative embodiment, an SMS application 205 executes on the mobile phone 115 along with an e-mail application 220 and other applications as collectively indicated by reference number 225. In some cases the e-mail application may be incorporated in a schedule application, which in turn may be embodied, for example, in commercially available software such as Microsoft Corporation's Outlook® messaging and collaboration client. However, other types of applications which support scheduling, calendar, and task management functionality either singly or in combination may also be used depending on the requirements of a given usage scenario. The e-mail application will generally be registered with the message server 40 in order to receive e-mail messages therefrom.

Supporting the applications 205, 220, and 225 in the architecture 200 are an operating system 230 and a hardware layer 235. In this illustrative embodiment, the operating system 230 is particularly adapted to operate on a resource-limited device and may comprise, for example, Microsoft Windows® CE. The hardware layer 235 provides an abstraction of the physical hardware implemented on the device 115 to the operating system 230 and applications 205, 220, and 225 above it. For example, such physical hardware may typically include a processor (e.g., a central processor or "CPU"), system memory such as read only memory ("ROM") and random accessory memory ("RAM"), bus structures, peripheral systems, drives, display devices, user controls and interfaces, etc. The hardware may also include storage media for storing computer-executable instructions (i.e., code) including either or both removable media and non-removable media such as magnetic and optical media, solid-state memory, and other conventional media. A UI 240 is also provided by the architecture 200 to support user interactivity and facilitate an effective user experience, and will typically be embodied as a graphical user interface.

The various functional components operating on the wireless communications device 115 may implement various interfaces allowing them to communicate among themselves as necessary. For instance, the SMS application 205 will typically interact with other applications executing on the mobile phone 115 with the use of APIs that are respectively exposed by the other applications. For example, an API which is exposed by e-mail application 220 enables the SMS application 205 to invoke various functions, pass parameters, and exchange data with the e-mail application 220. In particular, the SMS application 205 may use these API's to present a link to the user that allows the user to access the e-mail directly from the SMS message screen.

Figure 7:
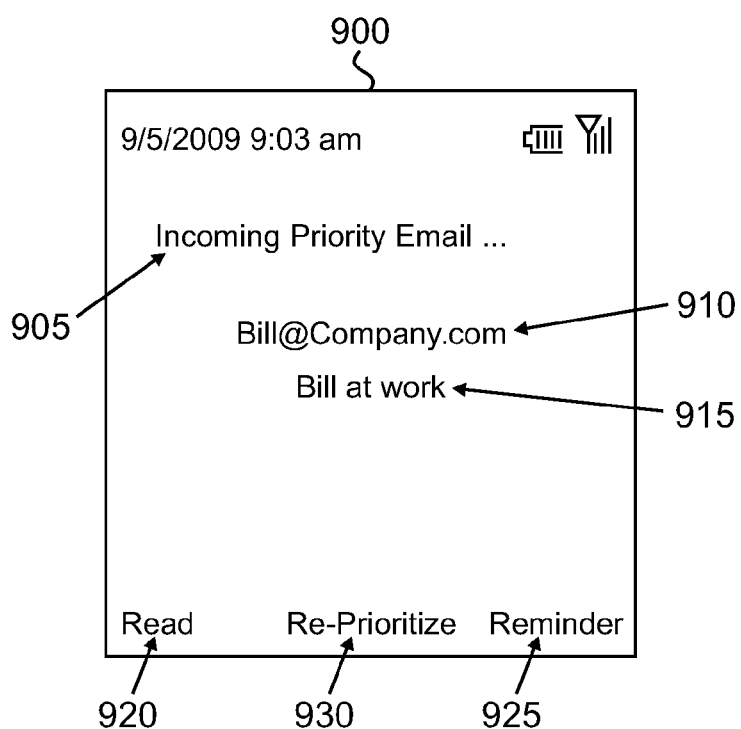
FIG. 7 shows an illustrative screenshot of an SMS message that may be displayed on a user's mobile communication device.

FIG. 7 shows an illustrative screenshot of the UI that is supported by the SMS application 205. Specifically, FIG. 7 shows an illustrative screen shot 900 of the UI when an incoming SMS message 905 is received at the mobile phone 115. In this example, the SMS message 905 is displayed and indicates that an incoming priority e-mail has been received by the mobile device 115. The SMS message 905 may include the sender's e-mail address 910 and identity 915. In some implementations, the SMS message may include, in addition to or as an alternative to the above items, a subset of the actual e-mail content such as selected fields in the message (e.g., the sender, subject, importance flag, first part of the message's body).

The user may be provided with e-mail handling options to either read the incoming message or establish a reminder by interfacing with the respective "Read" or "Reminder" icons 920 and 925 which are displayed on the UI by clicking on or otherwise activating the "read" icon, the user can directly access the e-mail in the e-mail application 220. In some implementations other handling options may also be presented. For example, in FIG. 7 a re-prioritize icon is displayed which can present a series of actions similar to that shown in FIG. 4. Depending on the hardware configuration of the mobile phone 115, buttons 920, 925 and 930 can be implemented using touch sensitive graphic icons, "soft" keys on the phone, or other various conventional controls. In this example, e-mail handling may be implemented by the SMS application 205 operating on the mobile communication device 115 in cooperation with the e-mail application 220 through appropriate APIs. In alternative implementations such e-mail handling functionality could be implemented by a plug-in or the like that works in cooperation with the SMS application 205 and/or the e-mail application 220.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or storage media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method performed on at least one computing device, the method comprising:
    forwarding, by the at least one computing device, an e-mail message to a user's communication device; and
    sending, by the at least one computing device in response to the forwarded e-mail message being considered a priority e-mail message, a real-time message to the user's communication device, where the sent real-time message includes a link that points to a location on the user's communication device of the forwarded e-mail message.

2. The method of claim 1 where the real-time message is a short message service (SMS) message.

3. The method of claim 1 further comprising:
    receiving the e-mail message, where the forwarding is in response to the receiving;
    applying rules associated with the user to the received e-mail message;
    generating, based on the applying, the real-time message.

4. The method of claim 1 further comprising determining that the forwarded e-mail message is considered the priority e-mail message based on rules associated with the user.

5. The method of claim 1 where the at least one computing device are part of a messaging system with which the user's communication device is registered.

6. The method of claim 1 where the real-time message includes an e-mail address or a name of a sender of the e-mail message.

7. The method of claim 1 where the real-time message includes information obtained from a subject field or a body of the e-mail message.

8. A system comprising a user's communication device and at least one software module that are together configured for performing actions, the user's communication device comprising a processor and memory, the actions comprising:
    receiving, by the user's communication device, a forwarded e-mail message that is considered a priority e-mail message;
    receiving, by the user's communication device, a real-time message that includes a link that points to a location on the user's communication device of the received e-mail message.

9. The system of claim 8 where the real-time message is an SMS message.

10. The system of claim 8 where the received real-time message includes an e-mail address or a name of a sender of the e-mail message, or information obtained from a subject field or a body of the e-mail message.

11. At least one tangible computer-readable media storing computer-readable instructions that, when executed by at least one processor of at least one computing device, cause the at least one computing device to perform actions comprising:
    forwarding, by the at least one computing device, an e-mail message to a user's communication device; and
    sending, by the at least one computing device in response to the forwarded e-mail message being considered a priority e-mail message, a real-time message to the user's communication device, where the sent real-time message includes a link that points to a location on the user's communication device of the forwarded e-mail message.

12. The at least one tangible computer-readable media of claim 11 where the real-time message is a short message service (SMS) message.

13. The at least one tangible computer-readable media of claim 11, the actions further comprising generating the real-time message.

14. The at least one tangible computer-readable media of claim 11, the actions further comprising determining that the forwarded e-mail message is considered the priority e-mail message based on rules associated with the user.

15. The at least one tangible computer-readable media of claim 11 where the real-time message includes an e-mail address or a name of a sender of the e-mail message.

16. The at least one tangible computer-readable media of claim 11 where the real-time message includes information from a subject field or a body of the e-mail message.

* * * * *